United States Patent
Hurt et al.

(10) Patent No.: US 6,580,533 B1
(45) Date of Patent: Jun. 17, 2003

(54) TWO-WAY OPTICAL TRANSMISSION AND RECEPTION DEVICE

(75) Inventors: Hans Hurt, Regensburg (DE); Gustav Müller, Regensburg (DE); Klaus Panzer, Regensburg (DE); Axel Schubert, München (DE); Werner Späth, Holzkirchen (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/318,392

(22) Filed: May 25, 1999

(30) Foreign Application Priority Data

May 25, 1998 (DE) .......................................... 198 23 213

(51) Int. Cl.[7] .......................... H04B 10/24; H04B 10/00
(52) U.S. Cl. ........................ 359/113; 359/152; 359/163
(58) Field of Search ................................ 359/152, 163; 385/67; 250/214 A, 227.24; 257/434

(56) References Cited

U.S. PATENT DOCUMENTS

| | | | | |
|---|---|---|---|---|
| 5,140,152 A | * | 8/1992 | Van Zeghbroeck | 250/214 |
| 5,914,976 A | * | 6/1999 | Jayaraman et al. | 372/50 |
| 5,925,898 A | * | 7/1999 | Späth | 257/98 |
| 5,991,058 A | * | 11/1999 | Feuer et al. | 359/125 |
| 6,008,917 A | * | 12/1999 | Moise et al. | 359/113 |

FOREIGN PATENT DOCUMENTS

| | | |
|---|---|---|
| DE | 2629356 | 1/1976 |
| DE | 4411380 A1 | 10/1995 |
| DE | 44 44 470 A1 | 5/1996 |
| DE | 19727632 A1 | 1/1999 |
| EP | 0679915 A2 | 11/1995 |
| WO | WO 96/17417 | 6/1996 |
| WO | WO 98/31080 | 7/1998 |

OTHER PUBLICATIONS

Japanese Patent Abstract No. 08179169 A (Susumu), dated Jul. 12, 1996.

* cited by examiner

*Primary Examiner*—Leslie Pascal
*Assistant Examiner*—Dalzid Singh
(74) *Attorney, Agent, or Firm*—Laurence A. Greenberg; Werner H. Stemer; Ralph E. Locher

(57) ABSTRACT

A transmission and reception device, in which the transmission device and the reception device and the input/output end of a glass fiber are disposed optically in series with respect to one another. A laser diode is disposed on a central part of a photosensitive surface and the input/output end of the glass fiber is in turn adjusted in front of its end face. As a result of a cylindrical symmetry of the photosensitive surface and of the laser diode with respect to a fiber axis, a maxima of the coupling curves coincide with the fiber axis, so that a lateral fiber offset leads to only a moderate change in coupling efficiency.

6 Claims, 3 Drawing Sheets

TWO-WAY OPTICAL TRANSMISSION AND RECEPTION DEVICE

BACKGROUND OF THE INVENTION

FIELD OF THE INVENTION

The invention relates to a transmission and reception device having a reception device and a transmission device disposed next to each other and to a two-way optical transmission configuration.

For the two-way transmission of data via glass fibers, it is necessary to have transmission and reception components respectively at both ends of a glass fiber section, which may be reciprocally assigned to one another. In data transmission, it is necessary to ensure that the transmitter on one side of the transmission section and the receiver on the other side have good optical coupling to the glass fiber. In the prior art, for example, transmission/reception devices are known in which, using controllable branching elements such as optical splitters or the like, the transmitter or the receiver can respectively be coupled optically to the-glass fiber. Besides such devices, which have a relatively complicated structure, there are however also simple structures in which the transmitter and the receiver remain optically coupled to the glass fiber. It is devices of this type that the present application addresses.

In a generic transmission/reception device of this type, a transmission diode is placed close beside a reception diode (photodiode) on a support material. Coupling curves respectively show a degree of coupling or a coupling efficiency with respect to a lateral displacement between an input/output end of a glass fiber and the transmission diode or the reception diode, respectively. The glass fiber is adjusted centrally between the transmission and reception diodes. Optimum data transmission is achieved when the fiber axis runs through a point of intersection of the coupling curves. The disadvantage with this configuration is, however, that the fiber axis in each case intersects with the steep sides of the coupling curves, and a lateral fiber offset therefore leads to a relatively strong loss on transmission or on reception.

SUMMARY OF THE INVENTION

It is accordingly an object of the invention to provide a two-way optical transmission and reception device which overcomes the above-mentioned disadvantages of the prior art devices of this general type, which has improved coupling in that a lateral fiber offset leads to a smaller coupling loss.

With the foregoing and other objects in view there is provided, in accordance with the invention, in a bi-directional optical transmission configuration having a glass fiber with an input/output end, a transmission/reception device, containing:

a reception device; and a transmission device, the reception device, the transmission device, and the input/output end of the glass fiber disposed optically in series with respect to one another.

The invention proposes that the transmission device, the reception device and the input/output end of the glass fiber are disposed optically in series with respect to one another. This provides the possibility of aligning the components optically with one another, that is to say placing the maxima of the coupling curves of the transmission device and of the reception device at one position in the lateral direction, and adjusting the input/output end of the glass fiber in such a way that the fiber axis runs through these maxima.

The advantage of the invention is, on the one hand, that the fiber axis runs through the maxima of both coupling curves and therefore permits more efficient input and output coupling of the optical radiation. On the other hand, in the event of a fiber offset, the fiber axis does not move along the steep sides of the coupling curves, but in the region of the maximum here the coupling does not change very strongly. A fiber offset therefore leads only to a moderate change in the transmission properties.

Other features which are considered as characteristic for the invention are set forth in the appended claims.

Although the invention is illustrated and described herein as embodied in a two-way optical transmission and reception device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 3:
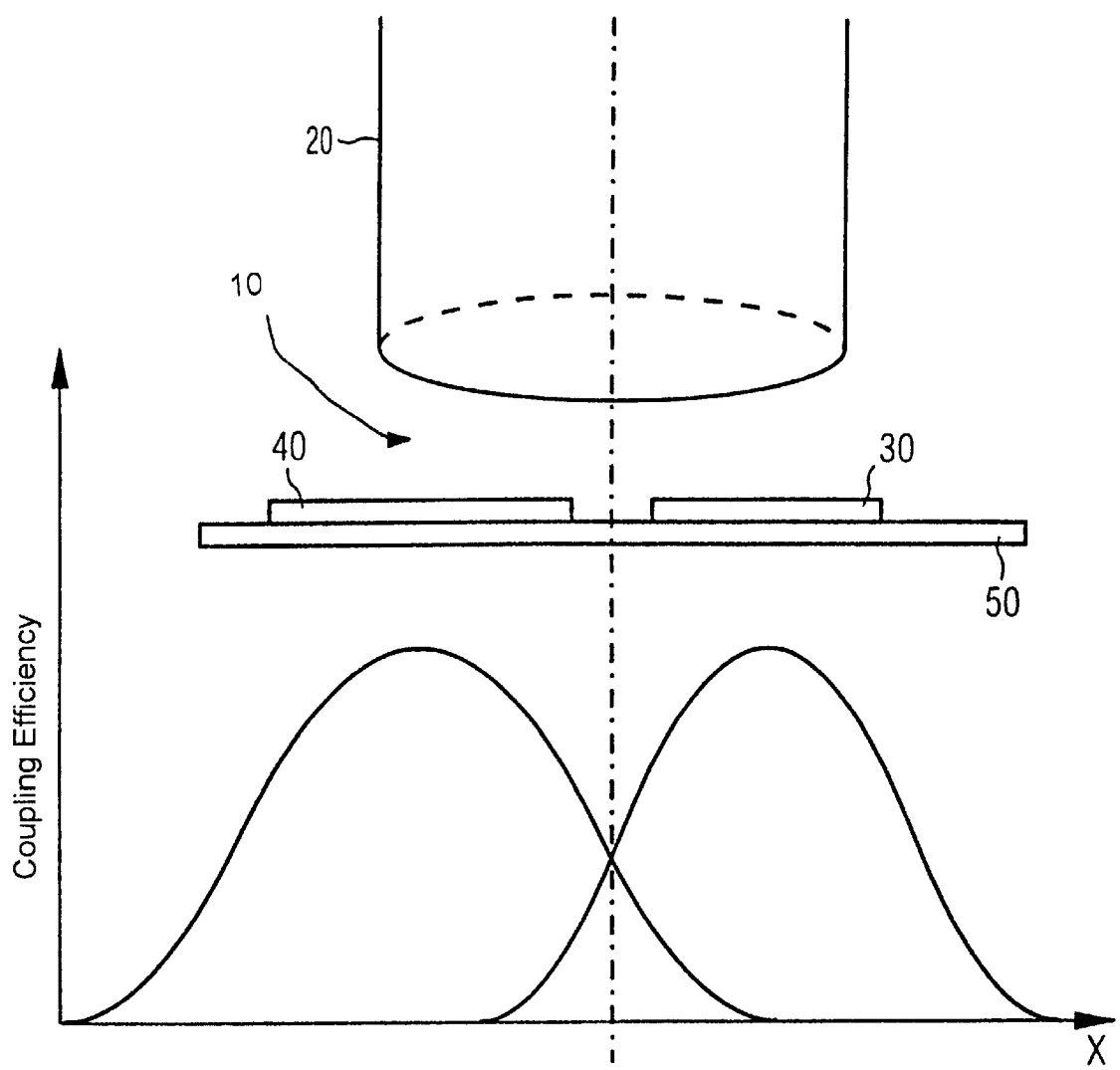
FIG. 3 is a front elevational view of the transmission/reception device and associated coupling curves according to the prior art.

In all the figures of the drawing, sub-features and integral parts that correspond to one another bear the same reference symbol in each case. Referring now to the figures of the drawings in detail and first, particularly, to FIG. 3 thereof, there is shown a generic transmission/reception device 10 having a transmission diode 30 placed close beside a reception diode (photodiode) 40 on a support material 50. The lower part of FIG. 3 represents so-called coupling curves of the transmission and reception diodes 30, 40. The coupling curves respectively show a degree of coupling or a coupling efficiency with respect to a lateral displacement between an input/output end of a glass fiber 20 and the transmission diode 30 or the reception diode 40, respectively. The glass fiber 20 is adjusted centrally between the transmission and reception diodes 30, 40. Optimum data transmission is achieved when a fiber axis runs through a point of intersection of the coupling curves. The disadvantage with this configuration is, however, that the fiber axis in each case intersects with the steep sides of the coupling curves, and a lateral fiber offset therefore leads to a relatively strong loss on transmission or on reception.

Figure 1A:
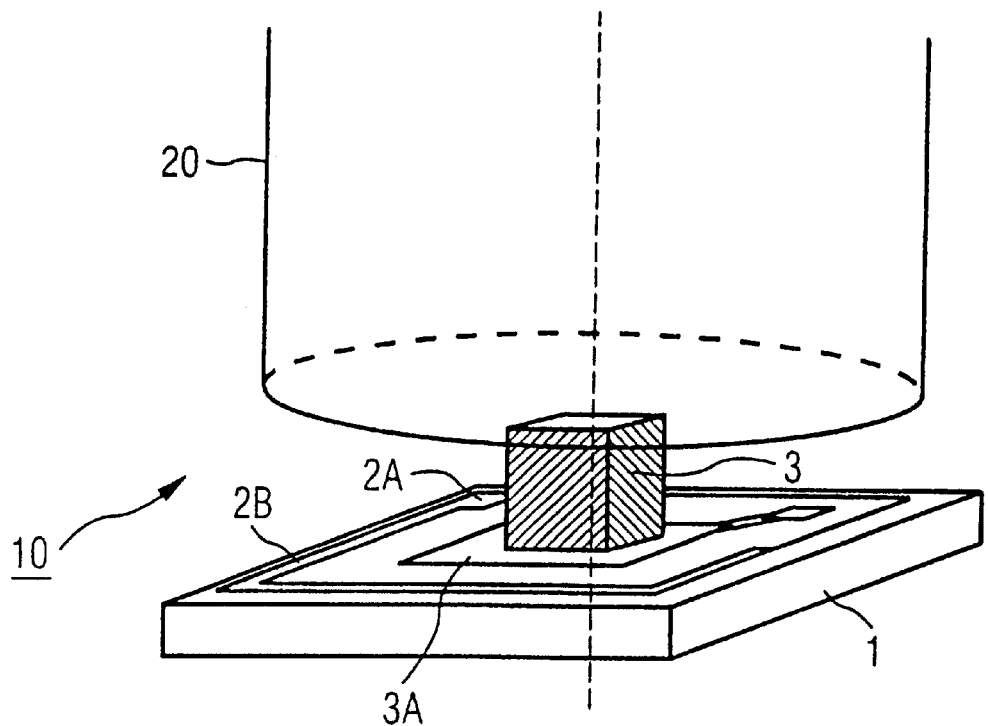
FIG. 1A is a diagrammatic, perspective view of a transmission/reception device according to the invention.
Figure 1B:
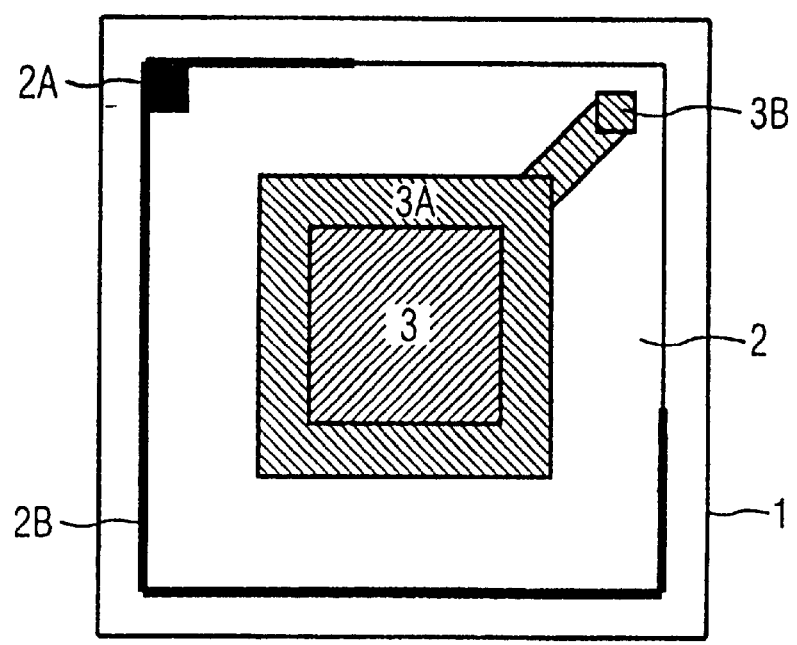
FIG. 1B is a plan view of the transmission/reception device shown in FIG. 1.

FIGS. 1A and 1B schematically represent an illustrative embodiment of the transmission/reception device 10 according to the invention, FIG. 1B being a plan view from the viewpoint of the glass fiber 20.

For two-way data transmission, the transmission/reception device 10 is coupled to the glass fiber 20 and has, a square flat substrate 1. On a face of the flat substrate 1, on the same side as the glass fiber 20, there is a square photosensitive surface 2 which forms part of the reception diode (reception device) and in which the light emerging from the glass fiber 20 is converted into electric current. On the majority of an outer edge of the photosensitive surface 2, edge metallization 2B. is applied in order to efficiently collect charge carriers generated in the photosensitive surface 2. Using a metallic contact surface 2A applied to the photosensitive surface 2 in one corner, electric contact can be made by a gold wire or the like.

The photosensitive surface 2 encloses a square metallization surface 3A which is used to make electric contact with a laser diode 3 (transmission device) disposed on top. The metallization surface 3A is connected by a metallic span to a metallic contact surface 3B and can be externally connected using this, likewise by a gold wire or the like. When the laser diode 3 is supplied with an electric current, it emits electromagnetic radiation which is coupled into the glass fiber 20 disposed directly above the upper end surface of the laser diode 3 in FIG. 1A.

Figure 2:
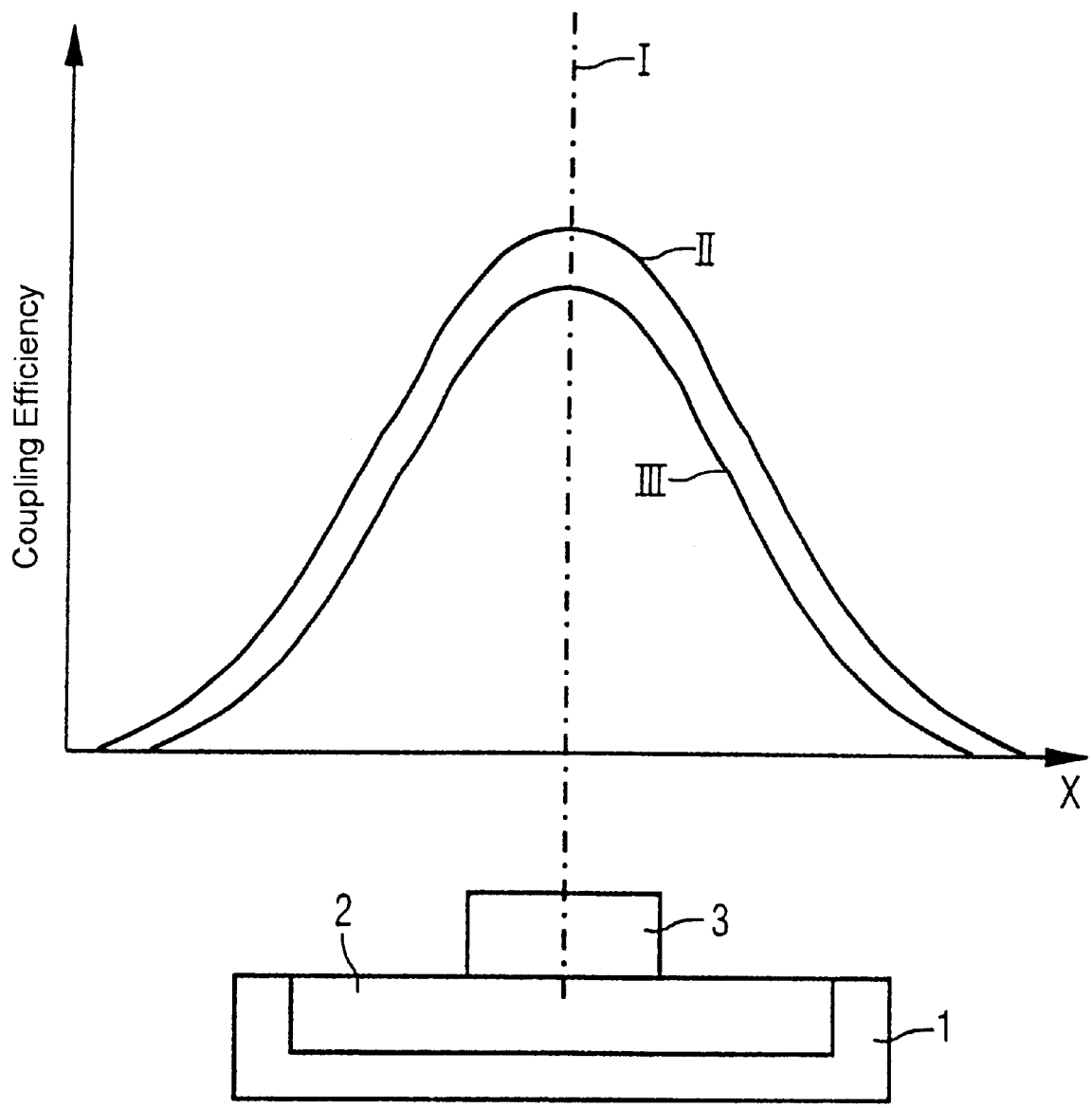
FIG. 2 is a graph showing the relative position of a fiber axis with respect to coupling curves in the case of the transmission/reception device shown in FIG. 1.

As represented in FIG. 2, the configuration according to the invention has the effect, on the one hand, that the maxima of the coupling curves II and III of the reception diode 2 and of the transmission diode 3, respectively, coincide. The glass fiber 20 is then further[]adjusted in front of an upper end surface of the laser diode 3 in such a way that the fiber axis I essentially coincides with the maxima of the coupling curves II and III. In a region of the maxima of the coupling curves II and III, the coupling efficiency is relatively constant over a relatively large region in the lateral direction (x direction). A corresponding lateral fiber offset therefore also leads only to a correspondingly slight change in the coupling conditions.

In the illustrative embodiment chosen, a side length of the square substrate was 1.35 mm, a side length of the square metallization surface 3A was 430 μm and a side length of the laser diode was 300 μm and the side length of the metallization surface 3B was 110 μm.

The illustrative embodiment chosen is noteworthy by the fact that the photosensitive surface 2 and the laser diode 3 are disposed cylindrically symmetric with respect to the fiber axis. This is not absolutely necessary. Instead, what is important is for the emission characteristic of the laser diode 3 and for the reception characteristic of the reception diode 2 to be cylindrically symmetric with respect to the fiber axis.

In the illustrative embodiment chosen, the transmission device 3 is disposed between the reception device 2 and the input/output end of the glass fiber 20. The reverse case is, however, also conceivable in which the reception device 2 is disposed between the transmission device 3 and the input/output end of the glass fiber 20. In an analogous way to the illustrative embodiment, the transmission diode 3 could for example have a relatively large-area light exit surface and a relatively small-area photosensitive surface of a reception diode could be disposed in a central region of the light exit surface.

What is claimed is:

1. In a bi-directional optical transmission configuration having a glass fiber with an input/output end, a transmission/reception device, comprising:

a reception device having a surface with a perimeter; and an emitting device having a surface with a perimeter;

said reception device, said emitting device, and the input/output end of the glass fiber disposed optically in series with respect to one another;

one of said reception device and said emitting device being disposed within said perimeter of said surface of the other of said emitting device and said reception device;

said emitting device and said reception device being disposed directly opposite to the input/output end of the glass fiber for coupling light of said emitting device directly onto the glass fiber and for coupling light of the glass fiber directly onto said reception device, resulting in one glass fiber being coupled to both said emitting device and said reception device.

2. The transmission/reception device according to claim 1, wherein the glass fiber has a fiber axis, said transmission device is coupled to said input/output end of the glass fiber, and said reception device is coupled to said input/output end of the glass fiber, a maximum in the coupling between said transmission device and the input/output end of the glass fiber in terms of lateral displacement and a maximum in the coupling between said reception device and the input/output end of the glass fiber in terms of lateral displacement and the fiber axis substantially coincide.

3. The transmission/reception device according to claim 2, wherein said transmission device is disposed between said reception device and the input/output end of the glass fiber.

4. The transmission/reception device according to claim 3, wherein:

said reception device has a photosensitive surface with a central region and a reception characteristic;

said transmission device is a laser diode having an emission characteristic and disposed in said central region of said photosensitive surface; and said reception characteristic of said photosensitive surface and said emission characteristic of said laser diode in a direction of the input/output end of the glass fiber being substantially cylindrically symmetric with respect to the fiber axis.

5. The transmission/reception device according to claim 4, wherein said photosensitive surface and said laser diode are cylindrically symmetric with respect to the fiber axis.

6. A bi-directional optical transmission configuration, comprising:

at least one glass fiber having an input/output end;

a reception device having a surface with a perimeter; and an emitting device having a surface with a perimeter;

said reception device, said emitting device, and the input/output end of the glass fiber disposed optically in series with respect to one another;

one of said reception device and said emitting device being disposed within said perimeter of said surface of the other of said emitting device and said reception device;

said emitting device and said reception device being disposed directly opposite to the input/output end of the glass fiber for coupling light of said emitting device directly onto the glass fiber and for coupling light of the glass fiber directly onto said reception device, resulting in one glass fiber being coupled to both said emitting device and said reception device.

* * * * *